(12) United States Patent
Luo et al.

(10) Patent No.: US 12,468,322 B2
(45) Date of Patent: Nov. 11, 2025

(54) HEAT DISSIPATION METHOD AND APPARATUS FOR ELECTRONIC DEVICE, AND STORAGE MEDIUM

(71) Applicant: VIVO MOBILE COMMUNICATION CO., LTD., Dongguan (CN)

(72) Inventors: Zhengwu Luo, Dongguan (CN); Xujun Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 591 days.

(21) Appl. No.: 18/070,459

(22) Filed: Nov. 28, 2022

(65) Prior Publication Data

US 2023/0093705 A1 Mar. 23, 2023

Related U.S. Application Data

(63) Continuation of application No. PCT/CN2021/096061, filed on May 26, 2021.

(30) Foreign Application Priority Data

May 29, 2020 (CN) .......................... 202010477939.2

(51) Int. Cl.
*H01M 10/44* (2006.01)
*G05D 23/19* (2006.01)
(Continued)

(52) U.S. Cl.
CPC ...... *G05D 23/1917* (2013.01); *H02J 7/00034* (2020.01); *H02J 7/0047* (2013.01); *H02J 50/10* (2016.02)

(58) Field of Classification Search
CPC .............. H02J 7/00034; H02J 7/00309; H02J 7/20945; H02J 7/007192; H02J 7/0047; G05D 23/1917
(Continued)

(56) References Cited

U.S. PATENT DOCUMENTS

2011/0163716 A1* 7/2011 Gale ..................... B60L 3/04
320/109
2017/0366035 A1* 12/2017 Meng ............... H01M 10/4257
(Continued)

FOREIGN PATENT DOCUMENTS

CN 104112883 A 10/2014
CN 205195325 U 4/2016
(Continued)

OTHER PUBLICATIONS

International Search Report issued in corresponding International Application No. PCT/CN2021/096061, mailed Jul. 20, 2021, 4 pages.
(Continued)

*Primary Examiner* — Edward Tso
(74) *Attorney, Agent, or Firm* — IPX PLLC

(57) ABSTRACT

A heat dissipation method and apparatus for an electronic device, and a storage medium, are provided. The heat dissipation method for an electronic device includes monitoring a communication message between an electronic device and a charger in a case that the electronic device is in a charging state, where the communication message includes a charging current value and a temperature value of a charging component of the electronic device; determining a charging stage of the electronic device based on the charging current value and the temperature value; determining a running power of a heat dissipation module based on the charging stage of the electronic device; and controlling the heat dissipation module to work at the running power, thereby dissipating heat of the electronic device.

15 Claims, 5 Drawing Sheets

(51) Int. Cl.
    *H01M 10/46*     (2006.01)
    *H02J 7/00*     (2006.01)
    *H02J 50/10*     (2016.01)

(58) Field of Classification Search
    USPC ....... 320/107, 125, 132, 150, 151, 152, 160, 320/161, 162, 164
    See application file for complete search history.

(56) References Cited

U.S. PATENT DOCUMENTS

| | | |
|---|---|---|
| 2018/0376625 A1 | 12/2018 | Truettner et al. |
| 2019/0036350 A1 | 1/2019 | Gleason et al. |

FOREIGN PATENT DOCUMENTS

| | | | |
|---|---|---|---|
| CN | 105552988 A | | 5/2016 |
| CN | 105846496 A | | 8/2016 |
| CN | 107248763 A | | 10/2017 |
| CN | 109888867 A | | 6/2019 |
| CN | 110535215 A | | 12/2019 |
| CN | 111655000 A | | 9/2020 |
| JP | 2010058635 A | | 3/2010 |

OTHER PUBLICATIONS

First Office Action issued in related Chinese Application No. 202010477939.2, mailed May 7, 2022, 9 pages.

\* cited by examiner

HEAT DISSIPATION METHOD AND APPARATUS FOR ELECTRONIC DEVICE, AND STORAGE MEDIUM

CROSS-REFERENCE TO RELATED APPLICATIONS

This application is a continuation of International Application No. PCT/CN2021/096061, filed on May 26, 2021, which claims priority to Chinese Patent Application No. 202010477939.2, filed on May 29, 2020. The entire contents of each of the above-identified applications are expressly incorporated herein by reference.

TECHNICAL FIELD

This application belongs to the field of heat dissipation, and specifically relates to a heat dissipation method and apparatus for an electronic device, and a storage medium.

BACKGROUND

With continuous development of electronic device technologies, a speed of a processor of an electronic device becomes increasingly high, and there are more and more service scenarios where a processor is overloaded, for example, a big on-line game scenario and a high-definition video call scenario. Generally, to reduce charging time, a current for charging a battery is relatively strong, leading to increasingly serious heat generation of an electronic device. Therefore, heat dissipation is generally performed on the electronic device in a charging state.

In the related art, when fast charging is performed on an electronic device, a temperature of the electronic device increases quickly. When the temperature rises to a certain threshold (namely, an upper temperature limit), the fast charging cannot be continued. In a charging process, there is usually a mismatch between a heat dissipation power and an actual heat dissipation demand of the charging process, resulting in low efficiency and high energy consumption.

SUMMARY

Embodiments of this application aim to provide a heat dissipation method and apparatus for an electronic device, and a storage medium.

According to a first aspect, an embodiment of this application provides a heat dissipation method for an electronic device. The method includes:
monitoring a communication message between an electronic device and a charger in a case that the electronic device is in a charging state, where the communication message includes a charging current value and a temperature value of a charging component of the electronic device;
determining a charging stage of the electronic device based on the charging current value and the temperature value;
determining a running power of a heat dissipation module based on the charging stage of the electronic device; and
controlling the heat dissipation module to work at the determined running power, thereby dissipating heat of the electronic device.

According to a second aspect, an embodiment of this application further provides a heat dissipation apparatus for an electronic device. The apparatus includes:
a message monitoring unit, configured to monitor a communication message between an electronic device and a charger in a case that the electronic device is in a charging state, where the communication message includes a charging current value and a temperature value of a charging component of the electronic device;
a charging stage determining unit, configured to determine a charging stage of the electronic device based on the charging current value and the temperature value;
a power determining unit, configured to determine a running power of a heat dissipation module based on the charging stage of the electronic device; and
a heat dissipation control unit, configured to control the heat dissipation module to work at the determined running power, thereby dissipating heat of the electronic device.

According to a third aspect, an embodiment of this application provides a heat dissipation device, including a controller and a heat dissipation module, where the controller is electrically connected to the heat dissipation module, and the controller is configured to execute the heat dissipation method for an electronic device according to the first aspect.

According to a fourth aspect, an embodiment of this application provides a readable storage medium. The readable storage medium stores a program or an instruction, where when the program or instruction is executed by a controller, the steps of the heat dissipation method for an electronic device according to the first aspect are implemented.

According to a fifth aspect, an embodiment of this application provides a chip. The chip includes a processor and a communications interface, where the communications interface is coupled with the processor, and the processor is configured to run a program or an instruction, to implement the method according to the first aspect.

DETAILED DESCRIPTION

The following describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first," "second," and the like in this specification and claims of this application are used to distinguish between similar objects instead of describing a specific order or sequence. It should be understood that the data used in this way is interchangeable in appropriate circumstances so that the embodiments of this application described can be implemented in other orders than the order illustrated or described herein. In addition, "and/or" in the specification and claims represents at least one of connected objects. Symbol "/" in this specification generally represents an "or" relationship between associated objects.

With reference to the accompanying drawings, the following describes in detail a heat dissipation method in the embodiments of this application based on embodiments and application scenarios thereof.

Figure 1:
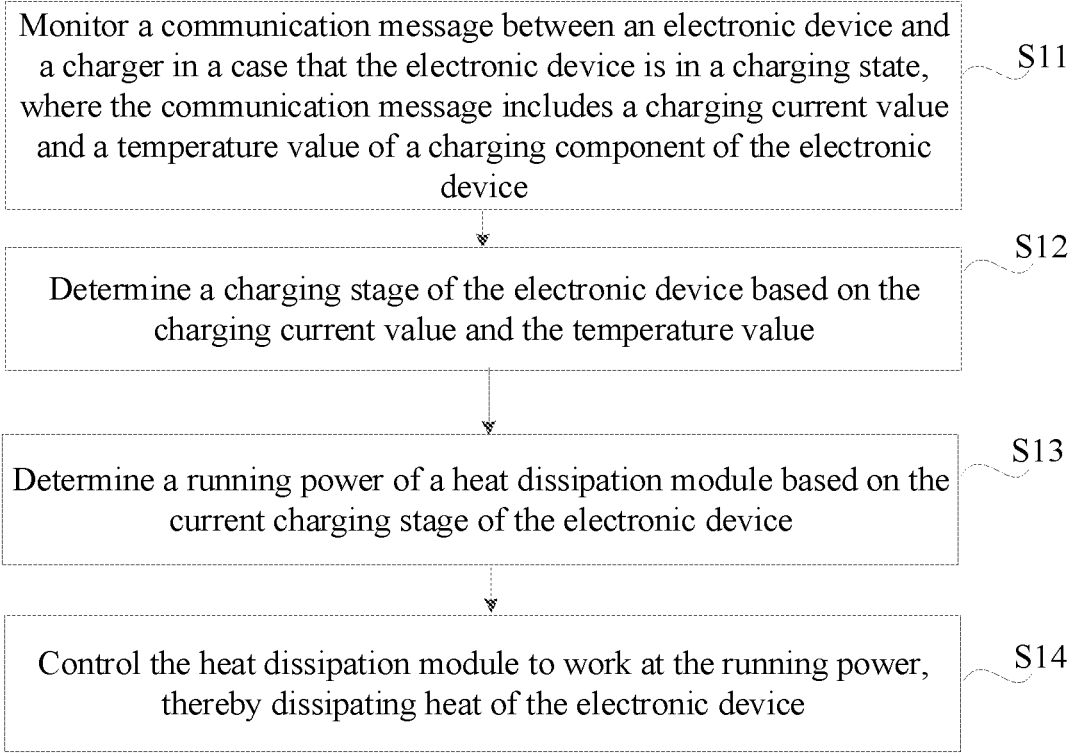
FIG. 1 is a flowchart of a heat dissipation method for an electronic device according to an embodiment of this application.
Figure 2:
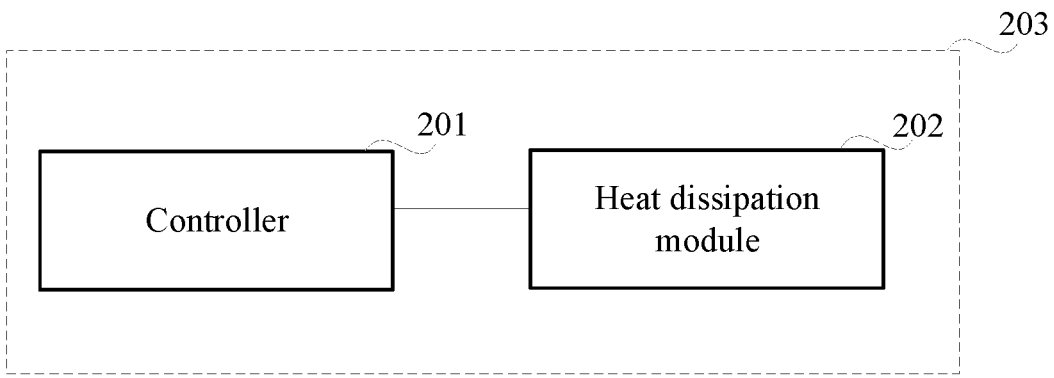
FIG. 2 is a block diagram of circuit connection of a heat dissipation device according to an embodiment of this application.

Referring to FIG. 1, an embodiment of this application provides a heat dissipation method for an electronic device, which may be applied to a controller 201. As shown in FIG. 2, the controller 201 is electrically connected to a heat dissipation module (or unit) 202. In some implementations, the controller 201 and the heat dissipation module 202 may be integrated in a heat dissipation back splint 203. The controller 201 may be disposed in the electronic device, and communicate with a heat dissipation module 202 disposed outside the electronic device. In addition, the controller 201 may be disposed in the electronic device together with the heat dissipation module 202, and the controller 201 is electrically connected to the heat dissipation module 202. The method includes the following steps.

Step S11: Monitor a communication message between the electronic device and a charger in a case that the electronic device is in a charging state, where the communication message includes a charging current value and a temperature value of a charging component of the electronic device.

The electronic device may be, but is not limited to, a mobile phone or a tablet computer. The charging component of the electronic device includes, but is not limited to, a rechargeable battery and a charging chip. The controller 201 may extract information such as the charging current value and the temperature value of the charging component of the electronic device from the communication message.

In some implementations, the communication message may be monitored in manners including, but are not limited to, the following two manners.

Manner 1: Monitor the communication message between the electronic device and the charger in a wired monitoring mode in a case that a mode of charging between the electronic device and the charger is a wired charging mode.

In some implementations, the controller 201 may be connected to a signal trace of communication between the electronic device and the charger during charging, thereby implementing monitoring the communication message by the controller 201.

Manner 2: Monitor the communication message between the electronic device and the charger in a wireless monitoring mode in a case that the mode of charging between the electronic device and the charger is a wireless charging mode.

For example, in a case that the mode of charging between the electronic device and the charger is a wireless charging mode using a bluetooth module or a WiFi module, the controller 201 may be further connected to the bluetooth module or WiFi module, thereby monitoring a communication message of the bluetooth module or WiFi module that performs wireless charging.

Step S12: Determine a charging stage of the electronic device based on the charging current value and the temperature value.

To be fully charged, the battery of the electronic device undergoes different stages. Different charging stages have different charging current values and temperature values of the charging component of the electronic device.

Step S13: Determine a running power of a heat dissipation module 202 based on the charging stage of the electronic device.

In some implementations, the electronic device may store a mapping relationship table between the charging stages and the running power. A value of the running power of the heat dissipation module 202 can be obtained by searching the mapping relationship table based on the charging stage.

Step S14: Control the heat dissipation module to work at the running power, thereby dissipating heat of the electronic device.

The heat dissipation method for an electronic device includes: monitoring a communication message between an electronic device and a charger in a case that the electronic device is in a charging state, where the communication message includes a charging current value and a temperature value of a charging component of the electronic device; determining a charging stage of the electronic device based on the charging current value and the temperature value; determining a running power of a heat dissipation module based on the charging stage of the electronic device; and controlling the heat dissipation module to work at the running power, thereby dissipating heat of the electronic device. Because a value of the running power of the heat dissipation module matches the charging stage, a temperature rise of the electronic device to an upper temperature limit can be delayed, so as to ensure that time of fast charging is relatively long. Therefore, charging efficiency is improved, and energy consumption is reduced.

Figure 3:
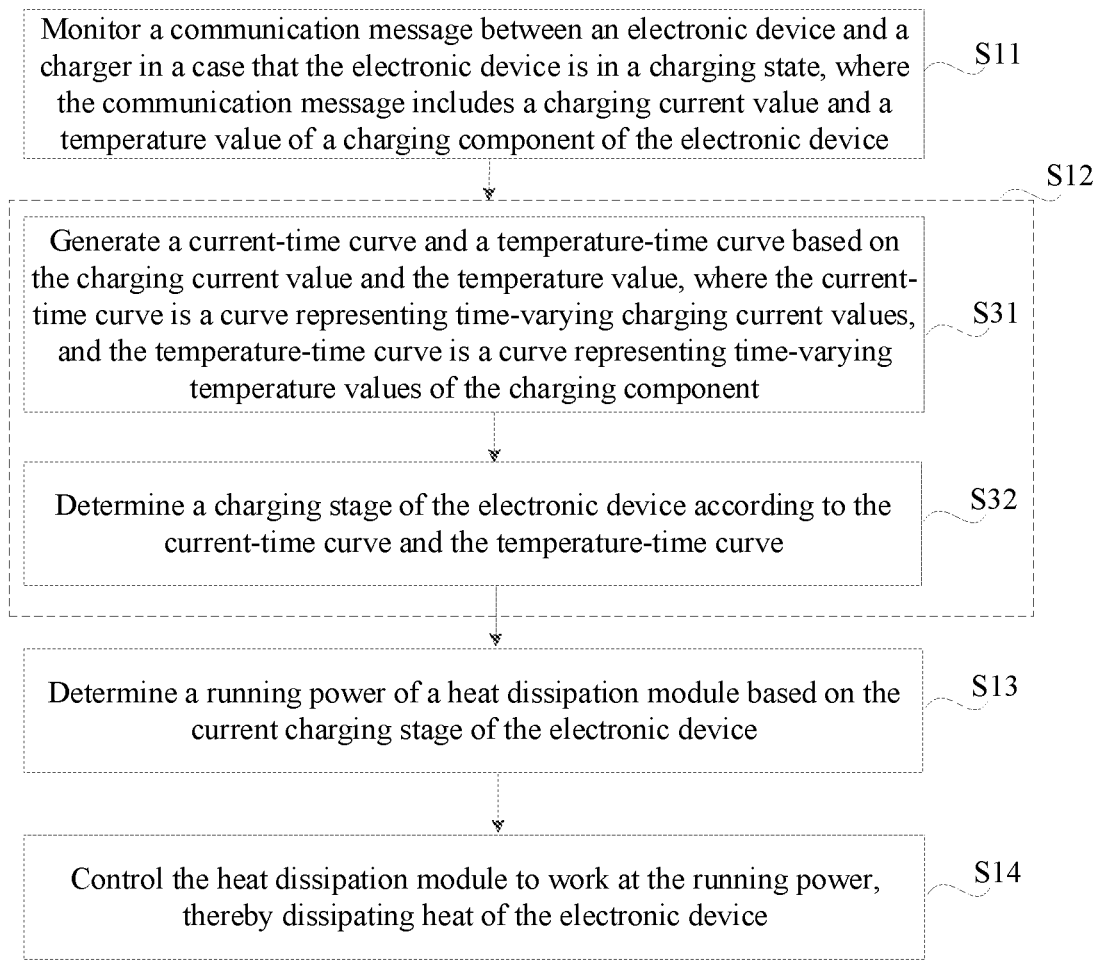
FIG. 3 is a flowchart of a heat dissipation method for an electronic device according to an embodiment of this application.

In some implementations, as shown in FIG. 3, S12 may include the following steps:

Step S31: Generate a current-time curve and a temperature-time curve based on the charging current value and the temperature value, where the current-time curve is a curve representing time-varying charging current values, and the temperature-time curve is a curve representing time-varying temperature values of the charging component.

Figure 4:
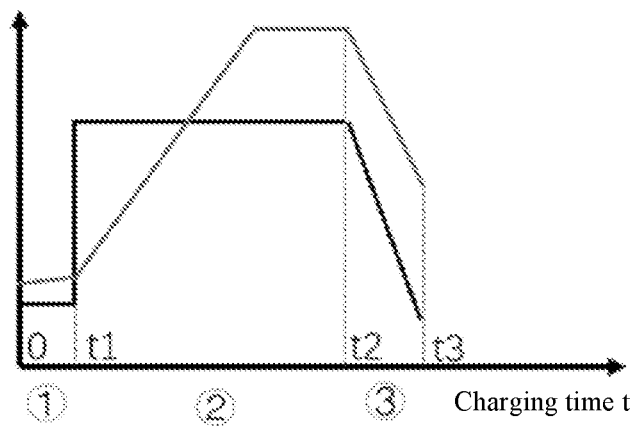
FIG. 4 is a schematic diagram showing a current-time curve and a temperature-time curve that are overlapped according to an embodiment of this application.
Figure 5:
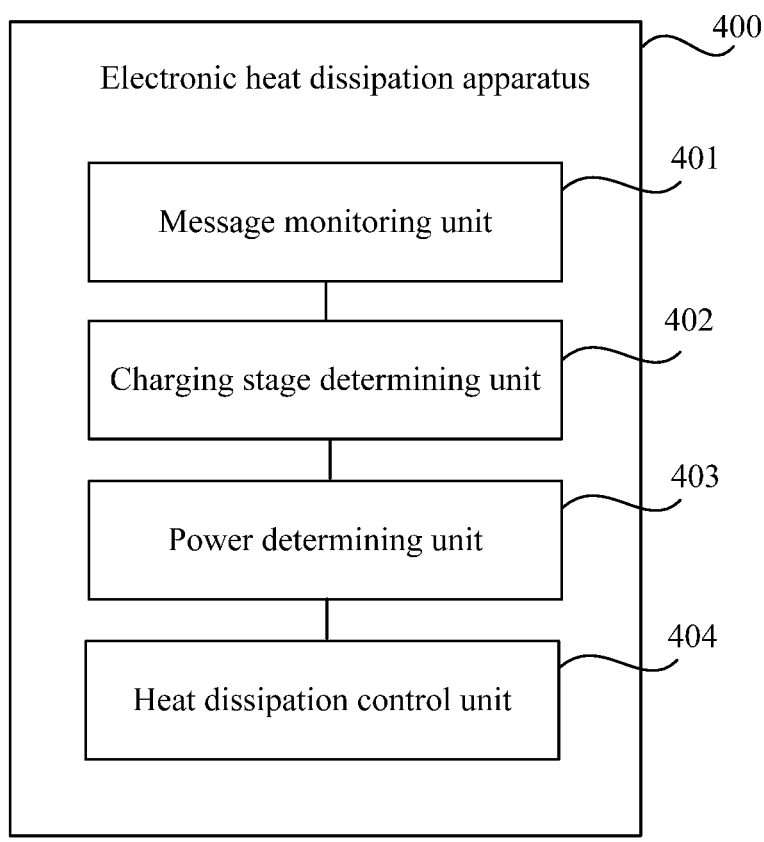
FIG. 5 is a block diagram of a functional module of a heat dissipation apparatus for an electronic device according to an embodiment of this application.
Figure 6:
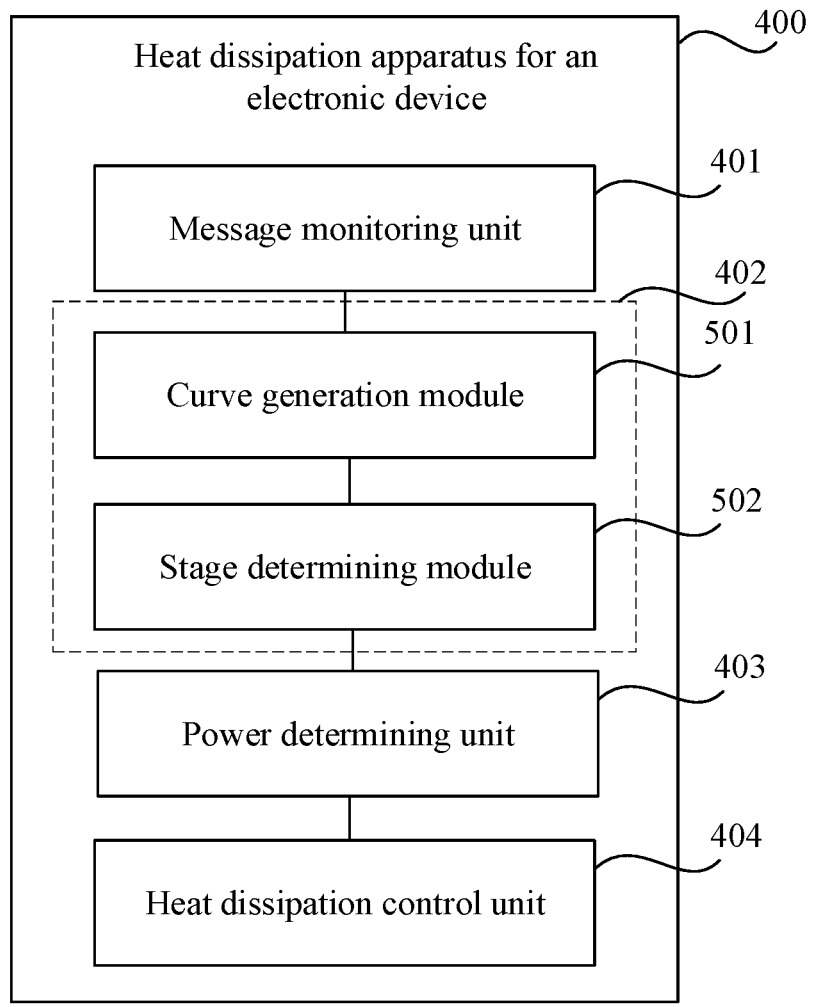
FIG. 6 is a block diagram of a functional module of a heat dissipation apparatus for an electronic device according to an embodiment of this application.

FIG. 4 shows the current-time curve and the temperature-time curve that are overlapped.

Step S32: Determine the charging stage of the electronic device according to the current-time curve and the temperature-time curve.

In some implementations, the charging stage may be determined in manners including, but are not limited to, the following three manners.

Manner 1: Determine the charging stage of the electronic device as a trickle charging stage in a case that the charging current value is less than a first threshold and a slope of the temperature-time curve is less than a second threshold.

It may be understood that the trickle charging stage has the following characteristics: The charging current value is relatively small, and a temperature of the charging component of the electronic device rises slowly.

Manner 2: Determine the charging stage of the electronic device as a constant current charging stage in a case that the charging current value is greater than the first threshold and that the slope of the temperature-time curve is greater than a third threshold, where the third threshold is greater than 0, or in a case that the charging current value is greater than the first threshold and that the temperature value is greater than a fourth threshold.

It may be understood that the constant current charging stage has the following characteristics: The charging current value is relatively large, and the temperature of the charging component of the electronic device rises quickly and reaches an upper temperature limit.

Manner 3: Determine the charging stage of the electronic device as a constant voltage charging stage in a case that a slope of the current-time curve is less than 0 and the slope of the temperature-time curve is less than 0.

It may be understood that the constant voltage charging stage has the following characteristics: The charging current value decreases gradually, so that heat generated by the charging component of the electronic device decreases gradually, and the temperature of the charging component of the electronic device drops gradually.

In some implementations, the above manner 3 of determining the charging stage may further include the following execution conditions: The charging current value is less than a preset fourth threshold and greater than the above first threshold.

In some implementations, the charging stage may include the trickle charging stage, the constant current charging stage, and the constant voltage charging stage. S13 may include the following steps.

The running power of the heat dissipation module 202 is determined as a first power in a case that the electronic device is in the trickle charging stage.

In a case that the controller 201 detects that the charger successfully shakes hand with the electronic device, a fast charge protocol is met. In this case, the electronic device enters the trickle charging stage (the charging current value is relatively small, the temperature of the charging component of the electronic device rises slowly, and the electronic device has not entered a fast charging mode yet), and the controller 201 enables the heat dissipation module 202 in advance at the first power, thereby lowering the temperature of the charging component of the electronic device in advance. Therefore, it can be ensured that when the electronic device subsequently enters the fast charging mode, time consumed by the charging component of the electronic device in reaching the upper temperature limit is prolonged (that is, fast charging time is prolonged). This improves charging efficiency. It is improper to set the first power to be too small or too large, so that the temperature of the charging component of the electronic device can be lowered in advance, and energy consumption cannot be too high. In addition, in a case that the charger successfully shakes hand with the electronic device, the fast charge protocol is not met. In this case, the controller 201 does not enable the heat dissipation module 202, thereby avoiding energy consumption.

The running power of the heat dissipation module 202 is determined as a second power in a case that the electronic device is in the constant current charging stage.

The electronic device enters the constant current charging stage (in the fast charging mode) when preset first time is reached after the electronic device enters the trickle charging stage. In this stage, the charging current value is relatively large, and the temperature of the charging component of the electronic device rises quickly. In this case, the controller 201 controls the heat dissipation module 202 to run at the second power, thereby improving efficiency of lowering the temperature of the charging component of the electronic device. Therefore, the time consumed by the charging component of the electronic device in reaching the upper temperature limit is further prolonged (that is, the fast charging time is prolonged). This improves charging efficiency. In addition, the second power needs to be greater than the first power, to ensure that the efficiency of lowering the temperature of the charging component of the electronic device can be improved.

The running power of the heat dissipation module 202 is determined as a third power in a case that the electronic device is in the constant voltage charging stage.

The electronic device enters the constant voltage charging stage (exits the fast charging mode) when the preset first time is reached after the electronic device enters the constant current charging stage. In this case, a current value included in current information decreases gradually, so that heat generated by the charging component of the electronic device decreases gradually, and the temperature of the charging component of the electronic device drops gradually. Therefore, the time consumed by the charging component of the electronic device in reaching the upper temperature limit does not need to be prolonged; and decreasing the running power of the heat dissipation module 202 (the third power may be specified to be lower than the first power) can be considered, so as to reduce energy consumption of the heat dissipation module 202.

Referring to FIG. 4, an embodiment of this application further provides a heat dissipation apparatus 400 for an electronic device, which may be applied to a controller 201. As shown in FIG. 2, the controller 201 is electrically connected to a heat dissipation module 202. The controller 201 and the heat dissipation module 202 may be integrated in a heat dissipation back splint 203. It should be noted that, the heat dissipation apparatus 400 for an electronic device in this embodiment of this application has the same basic principle and technical effect as the above embodiment. For the simplicity of description, contents not mentioned in this embodiment of this application may refer to those in the above embodiment. The apparatus 400 includes a message monitoring unit 401, a charging stage determining unit 402, a power determining unit 403, and a heat dissipation control unit 404.

The message monitoring unit 401 is configured to monitor a communication message between an electronic device and a charger in a case that the electronic device is in a charging state, where the communication message includes a charging current value and a temperature value of a charging component of the electronic device.

In some implementations, the communication message between the electronic device and the charger is monitored in a wired monitoring mode in a case that a mode of charging between the electronic device and the charger is a wired charging mode.

The communication message between the electronic device and the charger is monitored in a wireless monitoring mode in a case that the mode of charging between the electronic device and the charger is a wireless charging mode.

The charging stage determining unit 402 is configured to determine a charging stage of the electronic device based on the charging current value and the temperature value.

The power determining unit 403 is configured to determine a running power of the heat dissipation module 202 based on the charging stage of the electronic device.

The heat dissipation control unit 404 is configured to control the heat dissipation module to work at the running power, thereby dissipating heat of the electronic device.

The heat dissipation apparatus 400 for an electronic device can implement the following function during usage: monitoring a communication message between an electronic device and a charger in a case that the electronic device is in a charging state, where the communication message includes a charging current value and a temperature value of a charging component of the electronic device; determining a charging stage of the electronic device based on the charging current value and the temperature value; determining a running power of a heat dissipation module based on the charging stage of the electronic device; and controlling the heat dissipation module to work at the running power, thereby dissipating heat of the electronic device. Because a value of the running power of the heat dissipation module matches the charging stage, a temperature rise of the electronic device to an upper temperature limit can be delayed, so as to ensure that time of fast charging is relatively long. Therefore, charging efficiency is improved, and energy consumption is reduced.

In some implementations, the charging stage determining unit 402 includes: a curve generation module (or unit) 501, configured to generate a current-time curve and a temperature-time curve based on the charging current value and the temperature value, where the current-time curve is a curve representing time-varying charging current values, and the temperature-time curve is a curve representing time-varying temperature values of the charging component; and a stage determining module (or unit) 502, configured to determine the charging stage of electronic device according to the current-time curve and the temperature-time curve.

In some implementations, the stage determining module 502 is configured to: determine the charging stage of the electronic device as a trickle charging stage in a case that the charging current value is less than a first threshold and a slope of the temperature-time curve is less than a second threshold; determine the charging stage of the electronic device as a constant current charging stage in a case that the charging current value is greater than the first threshold and that the slope of the temperature-time curve is greater than a third threshold, where the third threshold is greater than 0, or in a case that the charging current value is greater than the first threshold and that the temperature value is greater than a fourth threshold; and determine the charging stage of the electronic device as a constant voltage charging stage in a case that a slope of the current-time curve is less than 0 and the slope of the temperature-time curve is less than 0.

The power determining unit 403 is configured to: determine the running power of the heat dissipation module 202 as a first power in a case that the electronic device is in the trickle charging stage; determine the running power of the heat dissipation module 202 as a second power in a case that the electronic device is in the constant current charging stage; and the running power of the heat dissipation module 202 is determined as a third power in a case that the electronic device is in the constant voltage charging stage, where the second power is greater than the first power, and the first power is greater than the third power.

Referring to FIG. 2, an embodiment of this application further provides a heat dissipation device, including a controller 201 and a heat dissipation module 202, where the controller 201 is electrically connected to the heat dissipation module 202, and the controller 201 is configured to execute the heat dissipation method for an electronic device provided in the above embodiment. The heat dissipation method for an electronic device may include: monitoring a communication message between an electronic device and a charger in a case that the electronic device is in a charging state, where the communication message includes a charging current value and a temperature value of a charging component of the electronic device; determining a charging stage of the electronic device based on the charging current value and the temperature value; determining a running power of a heat dissipation module based on the charging stage of the electronic device; and controlling the heat dissipation module to work at the running power, thereby dissipating heat of the electronic device.

In some implementations, the heat dissipation module 202 includes a cooler and/or a fan. When the electronic device is in the charging state, the cooler and/or fan are/is attached to a back side of a battery mounting area of the electronic device.

In some implementations, the above heat dissipation device may be a heat dissipation back splint 203.

An embodiment of this application provides a readable storage medium. The readable storage medium stores a program or an instruction. When the program or instruction is executed by a controller, the steps of the heat dissipation method for an electronic device provided in the above embodiment are implemented. The heat dissipation method for an electronic device may include: monitoring a communication message between an electronic device and a charger in a case that the electronic device is in a charging state, where the communication message includes a charging current value and a temperature value of a charging component of the electronic device; determining a charging stage of the electronic device based on the charging current value and the temperature value; determining a running power of a heat dissipation module based on the charging stage of the electronic device; and controlling the heat dissipation module to work at the running power, thereby dissipating heat of the electronic device.

In some implementations, the heat dissipation module includes a cooler and/or a fan. When the electronic device is in the charging state, the cooler and/or fan are/is attached to a back side of a battery mounting area of the electronic device.

An embodiment of this application further provides a chip. The chip includes a processor and a communications interface. The communications interface is coupled with the processor. The processor is configured to run a program or an instruction to implement various processes of the above embodiment of the heat dissipation method for an electronic device. To avoid repetition, details are not described herein again.

It should be understood that the chip mentioned in the embodiments of this application may also be referred to as a system-on-chip, a system chip, a chip system, a system-on-a-chip, or the like.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially or the part contributing to the prior art may be implemented in the form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The embodiments of this application are described above with reference to the accompanying drawings, but this application is not limited to the foregoing specific implementations. The foregoing specific implementations are merely schematic instead of restrictive. Under enlightenment of this application, a person of ordinary skills in the art may make many forms without departing from aims and the protection scope of claims of this application, all of which fall within the protection scope of this application.

The invention claimed is:

1. A heat dissipation method for an electronic device, comprising:
   monitoring a communication message between the electronic device and a charger in a case that the electronic device is in a charging state, wherein the communication message comprises a charging current value and a temperature value of a charging component of the electronic device;
   determining a charging stage of the electronic device based on the charging current value and the temperature value;
   determining a running power of a heat dissipation unit based on the charging stage of the electronic device; and
   controlling the heat dissipation unit to work at the running power to dissipate heat of the electronic device.

2. The method according to claim 1, wherein the determining a charging stage of the electronic device based on the charging current value and the temperature value comprises:
   generating a current-time curve and a temperature-time curve based on the charging current value and the temperature value, wherein the current-time curve is a curve representing time-varying charging current values, and the temperature-time curve is a curve representing time-varying temperature values of the charging component; and
   determining the charging stage of the electronic device according to the current-time curve and the temperature-time curve.

3. The method according to claim 2, wherein the determining the charging stage of the electronic device according to the current-time curve and the temperature-time curve comprises:
   determining the charging stage of the electronic device as a trickle charging stage in a case that the charging current value is less than a first threshold and a slope of the temperature-time curve is less than a second threshold;
   determining the charging stage of the electronic device as a constant current charging stage in a case that the charging current value is greater than the first threshold, and that the slope of the temperature-time curve is greater than a third threshold or the temperature value is greater than a fourth threshold, wherein the third threshold is greater than 0; and
   determining the charging stage of the electronic device as a constant voltage charging stage in a case that a slope of the current-time curve is less than 0 and the slope of the temperature-time curve is less than 0.

4. The method according to claim 1, wherein the charging stage comprises a trickle charging stage, a constant current charging stage, and a constant voltage charging stage, and the determining a running power of a heat dissipation unit based on the charging stage of the electronic device comprises:
   determining the running power as a first power in a case that the electronic device is in the trickle charging stage;
   determining the running power as a second power in a case that the electronic device is in the constant current charging stage; and
   determining the running power as a third power in a case that the electronic device is in the constant voltage charging stage, wherein
   the second power is greater than the first power, and the first power is greater than the third power.

5. The method according to claim 1, wherein monitoring the communication message between the electronic device and the charger in a wired monitoring mode in a case that a mode of charging between the electronic device and the charger is a wired charging mode; and
   monitoring the communication message between the electronic device and the charger in a wireless monitoring mode in a case that the mode of charging between the electronic device and the charger is a wireless charging mode.

6. A non-transitory computer-readable medium storing instructions that, when executed by a processor, cause the processor to perform operations comprising:
   monitoring a communication message between an electronic device and a charger in a case that the electronic device is in a charging state, wherein the communication message comprises a charging current value and a temperature value of a charging component of the electronic device;
   determining a charging stage of the electronic device based on the charging current value and the temperature value;
   determining a running power of a heat dissipation unit based on the charging stage of the electronic device; and
   controlling the heat dissipation unit to work at the running power to dissipate heat of the electronic device.

7. The non-transitory computer-readable medium according to claim 6, wherein the determining a charging stage of the electronic device based on the charging current value and the temperature value comprises:
   generating a current-time curve and a temperature-time curve based on the charging current value and the temperature value, wherein the current-time curve is a curve representing time-varying charging current values, and the temperature-time curve is a curve representing time-varying temperature values of the charging component; and determining the charging stage of the electronic device according to the current-time curve and the temperature-time curve.

8. The non-transitory computer-readable medium according to claim 7, wherein the determining the charging stage of the electronic device according to the current-time curve and the temperature-time curve comprises:
   determining the charging stage of the electronic device as a trickle charging stage in a case that the charging current value is less than a first threshold and a slope of the temperature-time curve is less than a second threshold;
   determining the charging stage of the electronic device as a constant current charging stage in a case that the charging current value is greater than the first threshold, and that the slope of the temperature-time curve is greater than a third threshold or the temperature value is greater than a fourth threshold, wherein the third threshold is greater than 0; and
   determining the charging stage of the electronic device as a constant voltage charging stage in a case that a slope of the current-time curve is less than 0 and the slope of the temperature-time curve is less than 0.

9. The non-transitory computer-readable medium according to claim 6, wherein the charging stage comprises a trickle charging stage, a constant current charging stage, and a constant voltage charging stage, and the determining a running power of a heat dissipation unit based on the charging stage of the electronic device comprises:
   determining the running power as a first power in a case that the electronic device is in the trickle charging stage;
   determining the running power as a second power in a case that the electronic device is in the constant current charging stage; and
   determining the running power as a third power in a case that the electronic device is in the constant voltage charging stage, wherein
   the second power is greater than the first power, and the first power is greater than the third power.

10. The non-transitory computer-readable medium according to claim 6, wherein monitoring the communication message between the electronic device and the charger in a wired monitoring mode in a case that a mode of charging between the electronic device and the charger is a wired charging mode; and
   monitoring the communication message between the electronic device and the charger in a wireless monitoring mode in a case that the mode of charging between the electronic device and the charger is a wireless charging mode.

11. A heat dissipation device, comprising:
   a memory storing computer-readable instructions; and
   a processor coupled to the memory and configured to execute the computer-readable instructions, wherein the computer-readable instructions, when executed by the processor, cause the processor to perform operations comprising:
   monitoring a communication message between an electronic device and a charger in a case that the electronic device is in a charging state, wherein the communication message comprises a charging current value and a temperature value of a charging component of the electronic device;
   determining a charging stage of the electronic device based on the charging current value and the temperature value;
   determining a running power of a heat dissipation unit based on the charging stage of the electronic device; and
   controlling the heat dissipation unit to work at the running power to dissipate heat of the electronic device.

12. The heat dissipation device according to claim 11, wherein the determining a charging stage of the electronic device based on the charging current value and the temperature value comprises:
   generating a current-time curve and a temperature-time curve based on the charging current value and the temperature value, wherein the current-time curve is a curve representing time-varying charging current values, and the temperature-time curve is a curve representing time-varying temperature values of the charging component; and
   determining the charging stage of the electronic device according to the current-time curve and the temperature-time curve.

13. The heat dissipation device according to claim 12, wherein the determining the charging stage of the electronic device according to the current-time curve and the temperature-time curve comprises:
   determining the charging stage of the electronic device as a trickle charging stage in a case that the charging current value is less than a first threshold and a slope of the temperature-time curve is less than a second threshold;
   determining the charging stage of the electronic device as a constant current charging stage in a case that the charging current value is greater than the first threshold, and that the slope of the temperature-time curve is greater than a third threshold or the temperature value is greater than a fourth threshold, wherein the third threshold is greater than 0; and
   determining the charging stage of the electronic device as a constant voltage charging stage in a case that a slope of the current-time curve is less than 0 and the slope of the temperature-time curve is less than 0.

14. The heat dissipation device according to claim 11, wherein the charging stage comprises a trickle charging stage, a constant current charging stage, and a constant voltage charging stage, and the determining a running power of a heat dissipation unit based on the charging stage of the electronic device comprises:
   determining the running power as a first power in a case that the electronic device is in the trickle charging stage;
   determining the running power as a second power in a case that the electronic device is in the constant current charging stage; and
   determining the running power as a third power in a case that the electronic device is in the constant voltage charging stage, wherein
   the second power is greater than the first power, and the first power is greater than the third power.

15. The heat dissipation device according to claim 11, wherein monitoring the communication message between the electronic device and the charger in a wired monitoring mode in a case that a mode of charging between the electronic device and the charger is a wired charging mode; and
   monitoring the communication message between the electronic device and the charger in a wireless monitoring mode in a case that the mode of charging between the electronic device and the charger is a wireless charging mode.

\* \* \* \* \*